United States Patent
Nomura

[15] 3,680,458
[45] Aug. 1, 1972

[54] SPRING-ACTUATED MECHANISM PARTICULARLY FOR SINGLE-LENS REFLEX CAMERAS

[72] Inventor: Katsuhiko Nomura, Kawagoe, Japan

[73] Assignee: Asahi Kogaku Kogyo Kabushiki Kaisha, Tokyo-to, Japan

[22] Filed: Jan. 20, 1971

[21] Appl. No.: 107,886

[30] Foreign Application Priority Data

Jan. 26, 1970 Japan..........................45/6265

[52] U.S. Cl. ...................................................95/42
[51] Int. Cl. ...............................................G03b 19/12
[58] Field of Search.........................................85/42

[56] References Cited

UNITED STATES PATENTS

| | | | |
|---|---|---|---|
| 2,952,196 | 9/1960 | Goshima | 95/42 |
| 3,020,815 | 2/1962 | Landbrecht | 95/42 |
| 3,468,232 | 9/1969 | Knapp | 95/42 |

*Primary Examiner*—Samuel S. Matthews
*Assistant Examiner*—E. M. Bero
*Attorney*—Steinberg & Blake

[57] ABSTRACT

A spring-actuated mechanism particularly adapted for use in a single-lens reflex camera for actuating a tiltable reflector and diaphragm lever thereof. The mechanism includes a lever assembly supported for swinging movement about a given axis in a plane normal to the latter axis. A single spring, such as a coil spring, has a pair of elongated springy portions, which may form elongated free end portions of the coil spring respectively acting on the lever assembly to urge the latter in opposite directions about the above axis. One of the springy portions of the single spring is situated at a greater distance from the axis than the other, so that the lever assembly will be urged to turn about the axis by that one of the springy portions which is at the greater distance from said axis and with a moment the magnitude of which is determined by the difference in the distances between said springy portions from the axis about which the lever assembly turns.

5 Claims, 4 Drawing Figures

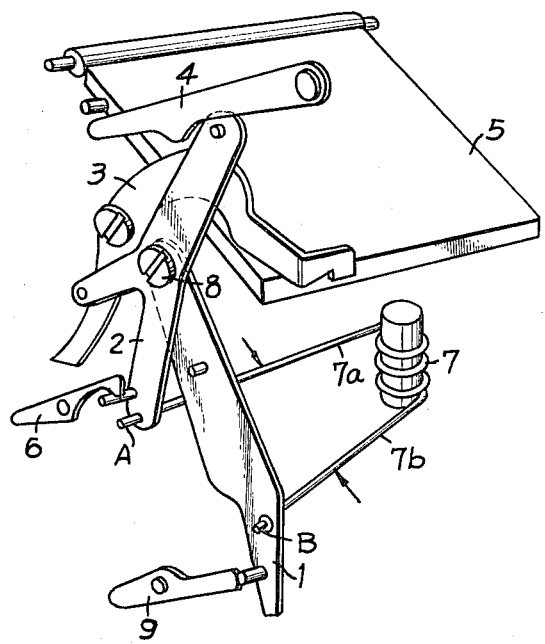
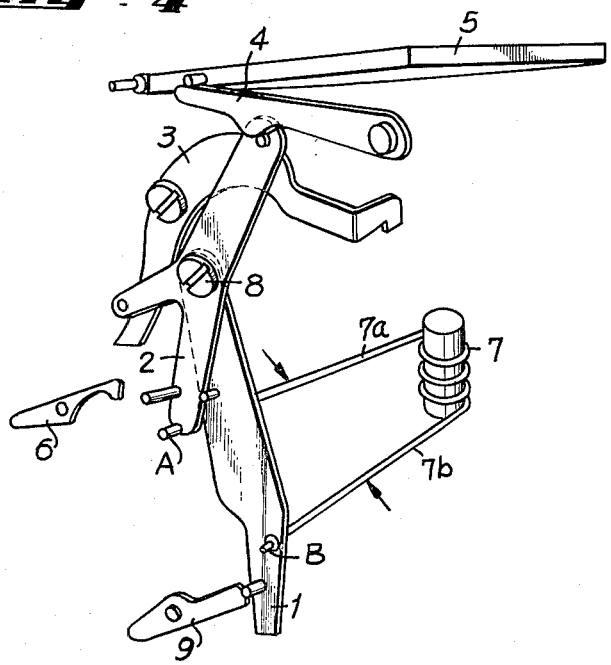

SPRING-ACTUATED MECHANISM PARTICULARLY FOR SINGLE-LENS REFLEX CAMERAS

BACKGROUND OF THE INVENTION

The present invention relates to spring-actuated mechanisms.

In particular, the present invention relates to spring-actuated mechanisms designed for use with single-lens reflex cameras, particularly to actuate a tiltable reflector and diaphragm of the camera.

Conventional mechanisms designed to tilt the reflector of a single-lens reflex camera as well as to actuate the diaphragm thereof have serious disadvantages in that a relatively large number of elements, including motion-transmitting links, are required. The relatively complex construction of such conventional mechanisms creates manufacturing problems as well as assembly problems, and the possibility of encountering faults which require repairs is relatively great.

SUMMARY OF THE INVENTION

It is accordingly a primary object of the present invention to provide a spring-actuated mechanism which will avoid the above drawbacks.

In particular, it is an object of the invention to provide a spring-actuated mechanism wherein a single spring will act directly on a lever assembly without requiring the use of intermediate linkages, thus greatly simplifying the cost of manufacture and assembly and also reducing the possibility of encountering faults which require repairs.

It is in particular an object of the present invention to provide a spring mechanism of this type which forms part of a single-lens reflex camera, particularly that part thereof which involves tilting of a reflector and actuating a diaphragm.

According to the invention the spring-actuated mechanism includes a lever means with a support means supporting the lever means for turning movement about a predetermined axis. A single spring has a pair of springy portions acting on the lever means for tending to urge the latter respectively in opposite directions. One of these springy portions is situated at a greater distance from the turning axis than the other, so that the turning moment is determined by this one springy portion in accordance with the difference between the distances of the springy portions from the turning axis. In an actual construction the lever means may actually be made up of a pair of levers one of which is a cocking lever means and the other of which is an actuating lever means for actuating at least one component. The single spring is adapted to be cocked by the cocking lever means and has its springy portions respectively acting the cocking lever means and the actuating lever means. A support means supports both of these lever means for turning movement about a common axis. The turning of the cocking lever means from a release to a cocked position will cock the spring so that it will tend to urge the actuating lever means from a cocked position to a release position, and a pair of releasable holding means coact respectively with the actuating lever means and cocking lever means for releasably holding them in their cocked positions until acted upon to release them for return to their release positions. In the case of a single-lens reflex camera the actuating lever means actuates a lever which swings a reflector of the camera and also actuates a diaphragm lever which actuates a diaphragm of the camera. The single spring preferably takes the form of a coil spring having a pair of elongated free end portions which form the springy portions acting on the lever means.

BRIEF DESCRIPTION OF DRAWINGS

The invention is illustrated by way of example in the accompanying drawings which form part of this application and in which:

FIG. 3 shows the positions assumed by the parts of FIG. 2 when the cocking lever is cocked while the actuating lever is held in its cocked position; and FIG. 4 illustrates the position in which the parts of FIGS. 2 and 3 take upon release of the actuating lever while the cocking lever is still in its cocked position.

DESCRIPTION OF PREFERRED EMBODIMENTS

Figure 1:
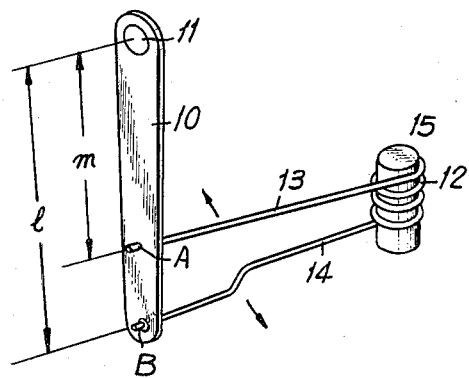
FIG. 1 schematically represents in a perspective view a mechanism which illustrates the principle of the invention.

The principle of the present invention is illustrated in FIG. 1.

Referring to FIG. 1, the spring-actuated mechanism shown therein includes a single coil spring 12 shown coiled about a stationary pin 15 and having a pair of elongated springy portions 13 and 14 in the form of elongated free end portions of the single spring 12. These springy portions 13 and 14 act on a lever means 10 in the form of a lever supported by a support means 11 for turning movement about an axis which is normal to the plane of the lever 10. Thus, the lever means 10 is supported by the pivot which forms the support means 11 for swinging movement in its own plane about an axis normal to this plane. It will be noted that the springy portions 13 and 14 extend substantially perpendicularly to the plane in which the lever means 10 is supported for turning movement by the support means 11. In the example illustrated the springy portion 13 extends through an opening A while the springy portion 14 extends through an opening B of the lever 10. The coiled portion of the spring 12 fits loosely around the pin 15. The springy portions 13 and 14 act on the lever means 10 so as to tend to urge the latter in opposite directions, as indicated by the arrows in FIG. 1. While in the particular example illustrated the springy portions 13 and 14 act on the lever means 10 in the directions in which the convolutions of the spring 12 are coiled, it is possible to achieve the same effect by utilizing spring forces acting in the uncoiling direction of the spring.

With this spring-actuated mechanism of FIG. 1 the lever means 10 will be urged to turn about the axis determined by the support means 11 in accordance with the direction in which the springy portion 14 acts on the lever means 10. This is apparent from the following equations. First, $$F_1 = F_2 = F$$

where $F_1$ and $F_2$ are forces of action which are applied by the springy portions 13 and 14. Of course, these forces are equal to each other and thus equal to the force F. These forces act at the openings A and B in the particular example shown in FIG. 1. Furthermore, $$M_a = mF_1 = mF, \qquad 1$$

$$M_b = lF_2 = lF, \qquad 2$$

where $m$ and $l$ are respectively the distances of the springy portions 13 and 14 from the pivot axis of lever means 10 determined by the support means 11, while $M_a$ and $M_b$ are the moments exerted on the lever means 10 at the openings A and B where the springy portions 13 and 14 respectively act on the lever means 10.

It is clear, therefore, that the effective torque M acting on the lever means 10 corresponds to the difference between equations (1) and (2) inasmuch as the directions of action of the springy portions at the openings A and B are opposite to each other. Thus, $$M = M_b - M_a = (l - m)F. \qquad 3$$

The torque of magnitude M corresponds, therefore, to the force with which the lever means 10 is urged to rotate in a counterclockwise direction, as viewed in FIG. 1, in that direction in which the lever means is acted upon by the springy portion 14 which is at the greater distance from the turning axis and with the moment of course being determined by the difference between the distances of the springy portions from the turning axis.

Figure 2:
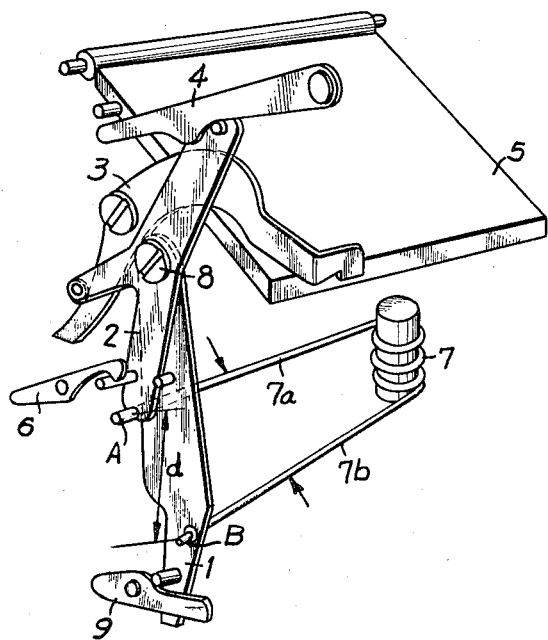
FIG. 2 shows a spring-actuated mechanism of the invention as applied to a single-lens camera, the parts being shown in FIG. 2 in a perspective view in the position they take when the parts are in a rest position.

The principle described above and illustrated in FIG. 1 is effectively applied to a single-lens reflex camera in the manner illustrated in FIGS. 2–4, in accordance with the present invention. Thus, referring to FIGS. 2–4, the lever means includes a cocking lever means 1 and an actuating lever means 2. The cocking lever means 1 will function to cock the single spring 7 while the actuating lever means 2 will function to actuate at least one component. In the illustrated example a pin at the top end of the actuating lever means 2 acts on a camming portion of a reflector lever 4 so as to swing this lever between the positions thereof shown in FIGS. 3 and 4. The lever 4 acts on a pin projecting from one edge of a tiltable reflector or mirror 5 well known in single-lens reflex cameras. This mirror normally extends at a 45° angle downwardly across the optical axis and is swingable along its upper edge from this latter position, where it prevents light from reaching the film to an upper exposure position illustrated in FIG. 4, as is well known. In its rest position, the mirror 5 assumes the location illustrated in FIGS. 2 and 3.

A releasable holding means 6 takes the form of a lever having a hook portion extending around a pin projecting from the actuating lever means 2, so that when the single spring 7 is cocked the releasable holding means 6 will hold the actuating lever 2 in the cocked position in which it is illustrated in FIGS. 2 and 3.

The single spring 7 has elongated free end portions 7a and 7b respectively corresponding to the springy portions 13 and 14. The elongated springy portions 7a extends through an opening A formed at the lower end of the actuating lever 2 while the elongated springy portion 7b extends through an opening B formed adjacent the lower end of the cocking lever 1. A support means 8 takes the form of a pivot which is common to the actuating lever 2 and cocking lever 1, supporting both of these levers for turning movement about a common axis normal to the plane in which both of the levers turn, and it will be noted that the elongated springy portions 7a and 7b extend substantially perpendicularly to the parallel planes in which the levers 1 and 2 respectively turn about the common turning axis formed by the support means 8. FIG. 2 illustrates the difference d betweeen the distances of the springy portions 7a and 7b from the common turning axis of the levers 1 and 2. The springy portions 7a and 7b act in opposite directions, as indicated by the arrows in FIG. 2. A second releasable holding means 9 is in the form of a lever which coacts with a pin projecting from the lower end region of the cocking lever 1 in order to releasably hold the latter in its cocked position.

The actuating lever 2 has an additional arm carrying a pin which engages a camming edge of a diaphragm-actuating lever 3 so as to act upon the lever 3 for initially closing the diaphragm when the mirror 5 is swung up to the exposure position shown in FIG. 4. As is well known after the mirror 5 is swung up to the exposure position the diaphragm is opened to the preselected extent and the exposure is made whereupon the diaphragm is again closed and the mirror returns to the rest position shown in FIGS. 2 and 3 so that the next subject to be photographed can be seen in the viewfinder, while the diaphragm-actuating lever 3 returns to its rest position also, permitting the diaphragm to open wide in order to permit viewing of the subject through the objective.

The parts are shown in FIG. 2 in their rest position. In this position of the parts the operator of the camera can look through the viewfinder so as to see the object which is to be photographed. In the position of the parts shown in FIG. 2 the actuating lever 2 is held by the releasable holding means formed by the lever 6 in its cocked position, although the spring 7 has not yet been cocked by the cocking lever 1. When the shutter-actuating button of the camera is depressed in connection with making an exposure, the first operation which takes place in an unillustrated manner is swinging of the cocking lever 1 from the rest position thereof shown in FIG. 2 into the cocked position thereof shown in FIG. 3, and it will be noted that at this time the front end of the releasable holding means formed by the lever 9 engages the pin projecting from the lever 1 so as to prevent return thereof to the release position shown in FIG. 2. The actuating lever 2 is prevented from turning beyond the position shown in FIGS. 2 and 3 by the releasable holding means 6, as described above, so that the springy portion 7b has in this way been turned in a direction opposite to that indicated by the arrow at the springy portion 7b in the drawings, thus cocking the spring, and now the springy portion 7a has a force stored therein for urging the actuating lever 2 in a counterclockwise direction.

During the continued depression of the shutter-releasing button of the camera the lever 6 is turned in a counterclockwise direction, as viewed in the drawings, through an unillustrated motion-transmission, thus releasing the actuating lever 2 so that it will be turned by the springy portion 7a in a counterclockwise direction, thus actuating components 3 and 4 so as to place the parts in the position shown in FIG. 4, and in this position an exposure is made in a well known manner. Thus, the reflector lever 4 has been acted upon by the actuating lever 2 to swing the quick-return mirror 5 upwardly to the exposure position, and the diaphragm lever 3 has been acted upon so as to initially close the diaphragm prior to raising of the reflector 5 to the exposure position, thus placing the camera in a position proper for making an exposure.

After the exposure has been made, an unillustrated mechanism acts on the lever 9 to turn the latter in a clockwise direction from the position shown in FIG. 4, so as to release the lever 1 for return to its release position, and the result is that the actuating lever 2 also returns automatically to its cocked position where it is again held by the releasable holding means 6.

Thus, with the above described exceedingly simple assembly a single spring has a pair of springy portions acting respectively on the cocking and actuating levers 1 and 2 with oppositely directed forces to bring about actuation of the components 3 and 4 and restoration of the components to their rest positions. The exceedingly simple structure is entirely free of any liklihood of improper operation and a long trouble-free operating life is assured. In addition the structure is exceedingly simple and inexpensive to manufacture and assemble. The complications encountered in conventional mechanisms for achieving similar results are completely avoided.

What is claimed is:

1. A spring-actuated mechanism comprising cocking lever means for cocking a spring and actuating lever means for actuating at least one component, support means supporting said cocking lever means and actuating lever means for turning movement about a common axis with each lever means being turnable about said axis between a cocked position and a release position, a pair of releasable holding means respectively coacting with said cocking lever means and actuating lever means for releasably holding them in their cocked positions and for releasing them for return from said cocked positions to said release positions, and a single spring having a pair of springy portions respectively acting on said cocking lever means and actuating lever means for respectively urging them in opposite directions about said axis and with the springy portion which acts on said cocking lever means situated at a greater distance from said axis than the springy portion which acts on said actuating lever means, said cocking lever means, when turned in a direction opposite to that in which it is urged by said spring, cocking said spring and being held in its cocking position by that one of said releasable holding means which holds said cocking lever means in its cocked position until the latter holding means is actuated to release said cocking lever means for return to its release position, while the other releasable holding means holds said actuating lever means in its cocked position when said cocking lever means is turned from its release to its cocked position, until said other holding means is actuated to release said actuating lever means for movement by said spring from its cocked to its release position during which said component is acted upon by said actuating lever means.

2. The combination of claim 1 and wherein said single spring is a coil spring having a pair of elongated free end portions forming said springy portions thereof and respectively acting on said cocking lever means and actuating lever means, said free end portions of said coil spring respectively extending substantially perpendicularly to parallel planes in which said cocking lever means and actuating lever means respectively turn about said common axis.

3. The combination of claim 2 and wherein said mechanism forms part of a single-lens reflex camera and including a tiltable reflector and a reflector lever forming said component and acted upon by said actuating lever means for tilting said reflector.

4. The combination of claim 2 and wherein said mechanism forms part of a single-lens reflex camera and includes a diaphragm lever which forms said component and is acted upon by said actuating lever means.

5. The combination of claim 3 and wherein a diaphragm-actuating lever forms a second component acted upon by said actuating lever means.

* * * * *